(12) United States Patent
Song et al.

(10) Patent No.: US 9,352,404 B2
(45) Date of Patent: May 31, 2016

(54) SAWING WIRE, METHOD AND EQUIPMENT FOR MANUFACTURING SUCH A WIRE, AND USE

(71) Applicant: SODETAL AWT, Tronville-en-Barrois (FR)

(72) Inventors: Gunchul Song, Luxembourg (LU); Serge Oms, Berbourg (LU); Bernard Serre, Ligny en Barrois (FR)

(73) Assignee: SODETAL AWT, Tronville-en-Barrois (FR)

( * ) Notice: Subject to any disclaimer, the term of this patent is extended or adjusted under 35 U.S.C. 154(b) by 72 days.

(21) Appl. No.: 14/385,267

(22) PCT Filed: Mar. 15, 2013

(86) PCT No.: PCT/EP2013/055479
§ 371 (c)(1),
(2) Date: Dec. 15, 2014

(87) PCT Pub. No.: WO2013/135895
PCT Pub. Date: Sep. 19, 2013

(65) Prior Publication Data
US 2015/0158098 A1  Jun. 11, 2015

(30) Foreign Application Priority Data

Mar. 16, 2012 (FR) .................................... 12 52389
Jun. 28, 2012 (FR) .................................... 12 56186

(51) Int. Cl.
*B23D 65/00* (2006.01)
*B21D 15/04* (2006.01)
*B23D 61/18* (2006.01)
*B28D 5/04* (2006.01)

(52) U.S. Cl.
CPC .............. *B23D 65/00* (2013.01); *B23D 61/185* (2013.01); *B28D 5/045* (2013.01)

(58) Field of Classification Search
CPC ...... B23D 65/00; B23D 61/185; B28D 5/045; B21D 15/04
USPC .................................. 125/21; 72/68, 77, 367
See application file for complete search history.

(56) References Cited

U.S. PATENT DOCUMENTS 2,437,630 A * 3/1948 Williams ................ B21C 47/20
242/128
2,928,528 A * 3/1960 Kelday ...................... B21C 3/02
72/103

(Continued)

FOREIGN PATENT DOCUMENTS

EP       1827745 A1    9/2007
GB       611372 A  * 10/1948  ................ B24B 5/48

(Continued)

*Primary Examiner* — George Nguyen
(74) *Attorney, Agent, or Firm* — Bachman & LaPointe, P.C.

(57) ABSTRACT

A monofilament metal sawing wire for a wire saw, which consists of a metal wire having a diameter D and comprising helical serrations which an amplitude A and wavelength B, wherein the wavelength B is less than 10,000 times the product of the amplitude and the diameter (A×D), and the amplitude A is between 0.010 and 0.400 times the diameter D, the values being expressed in millimeters. Equipment and a method for manufacturing such a wire involve causing the wire to vibrate between two guides while passing the wire between the guides. Such a wire can be used for sawing a block of hard material.

20 Claims, 9 Drawing Sheets

(56) References Cited

U.S. PATENT DOCUMENTS

| | | | | |
|---|---|---|---|---|
| 3,158,258 | A * | 11/1964 | Kelday | B21C 3/02 72/276 |
| 3,525,243 | A * | 8/1970 | Chrablow | B21C 1/20 134/1 |
| 4,055,073 | A * | 10/1977 | Langr | B21C 3/04 425/461 |
| 4,317,353 | A * | 3/1982 | Geppelt | B21D 15/04 72/18.9 |
| 4,872,923 | A * | 10/1989 | Borodin | C21D 8/06 148/559 |
| 5,829,424 | A * | 11/1998 | Hauser | B28D 5/045 125/16.01 |
| 5,907,988 | A * | 6/1999 | Kiuchi | B23D 57/0053 125/16.01 |
| 6,065,462 | A * | 5/2000 | Hodsden | B23D 65/00 125/21 |
| 6,390,896 | B1 * | 5/2002 | Huber | B23D 57/0053 125/12 |
| 6,543,434 | B2 * | 4/2003 | Holzmuller | B28D 5/042 125/12 |
| 6,899,920 | B2 * | 5/2005 | Meyer | B21C 47/26 427/178 |
| 7,025,665 | B2 * | 4/2006 | Bender | B28D 5/0082 125/16.02 |
| 2002/0029453 | A1 * | 3/2002 | Quick | B21C 37/047 29/423 |
| 2007/0098506 | A1 * | 5/2007 | Flynn | B23C 5/003 407/53 |
| 2008/0310784 | A1 * | 12/2008 | Ohtsuki | B60B 27/0005 384/544 |
| 2011/0126813 | A1 * | 6/2011 | Hodsden | B23D 57/0053 125/16.02 |
| 2012/0210993 | A1 * | 8/2012 | Baekelandt | B28D 1/124 125/21 |

FOREIGN PATENT DOCUMENTS

| | | |
|---|---|---|
| JP | 01289527 A | 11/1989 |
| JP | 2008290121 A * | 12/2008 |
| JP | 2006094066 A | 1/2010 |
| WO | 9012670 A1 | 11/1990 |
| WO | 2012069314 A1 | 5/2012 |

* cited by examiner

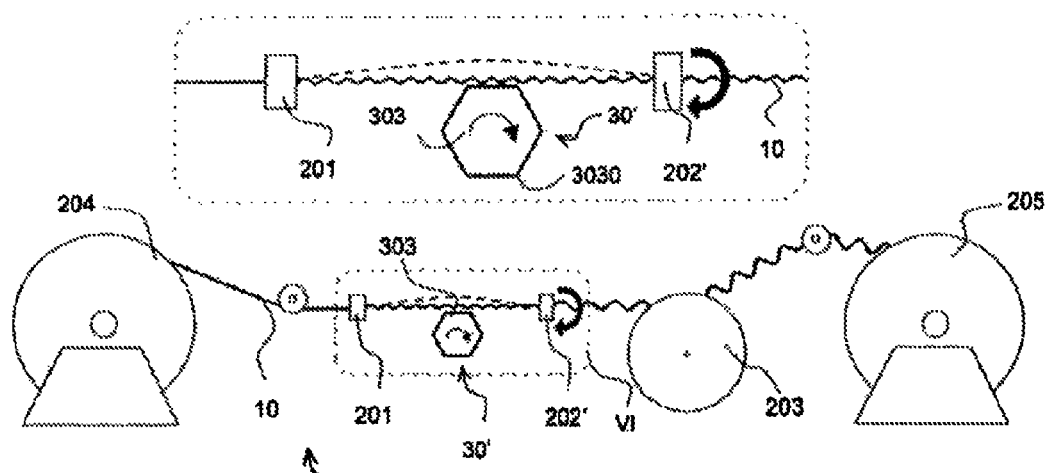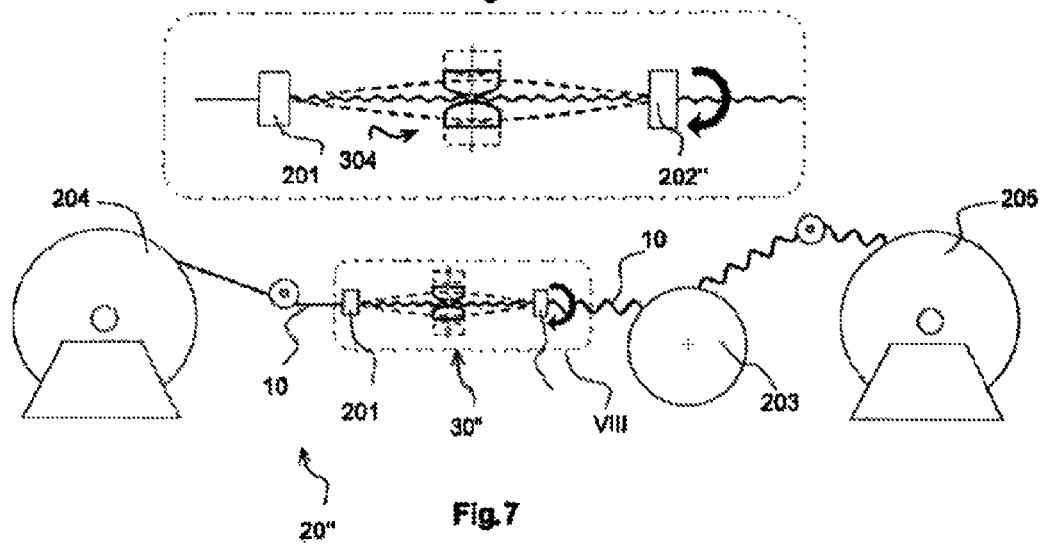

Fig. 10
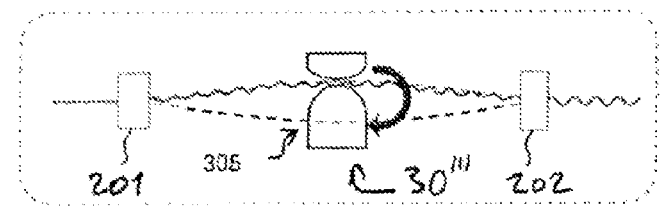
Fig. 9
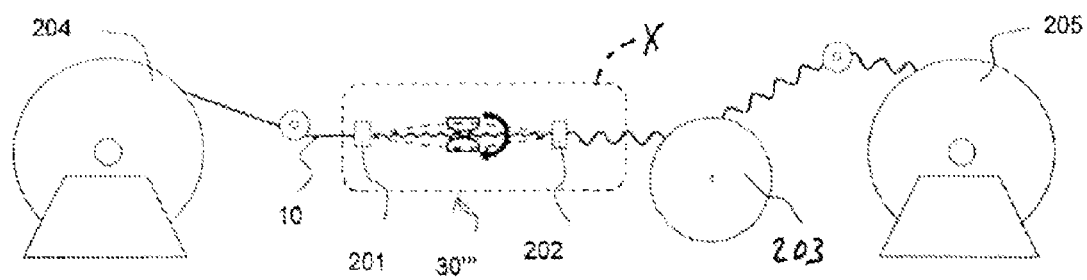
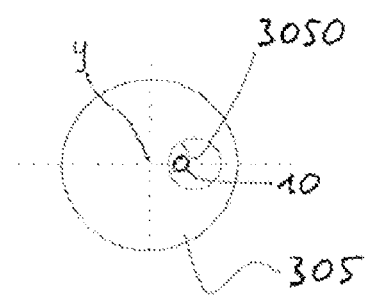
Fig. 11

Fig. 16
Prior art
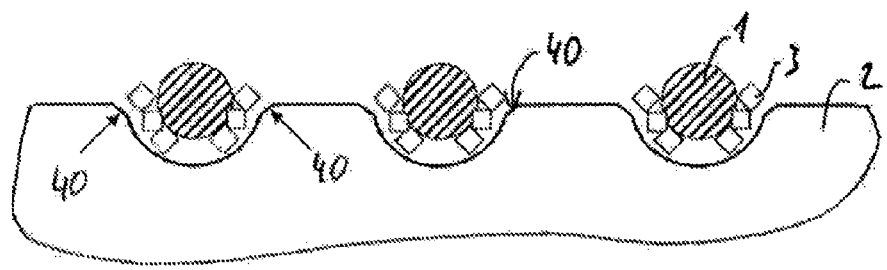
Fig. 17
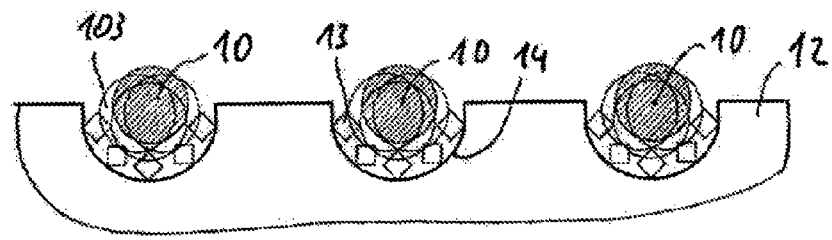
Cut surface (mm²)   Fig. 18
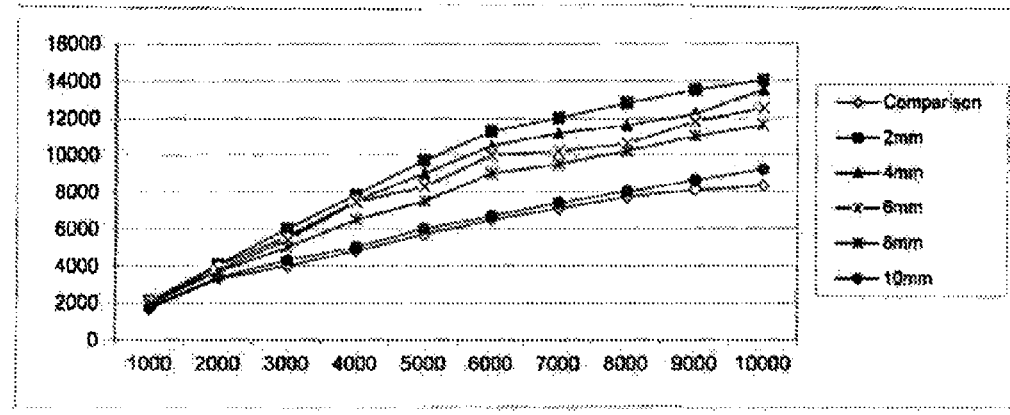

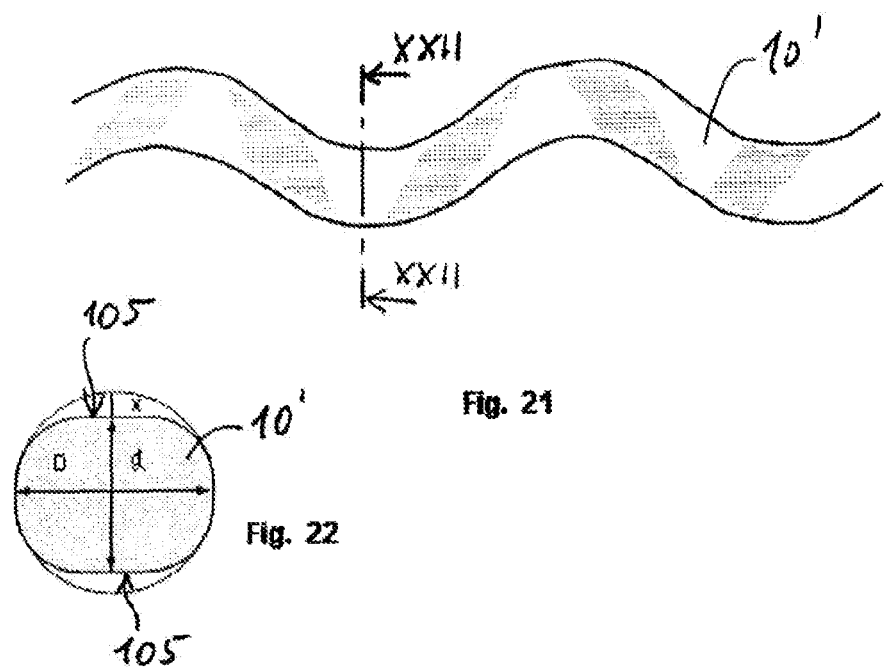
Fig. 21
Fig. 22
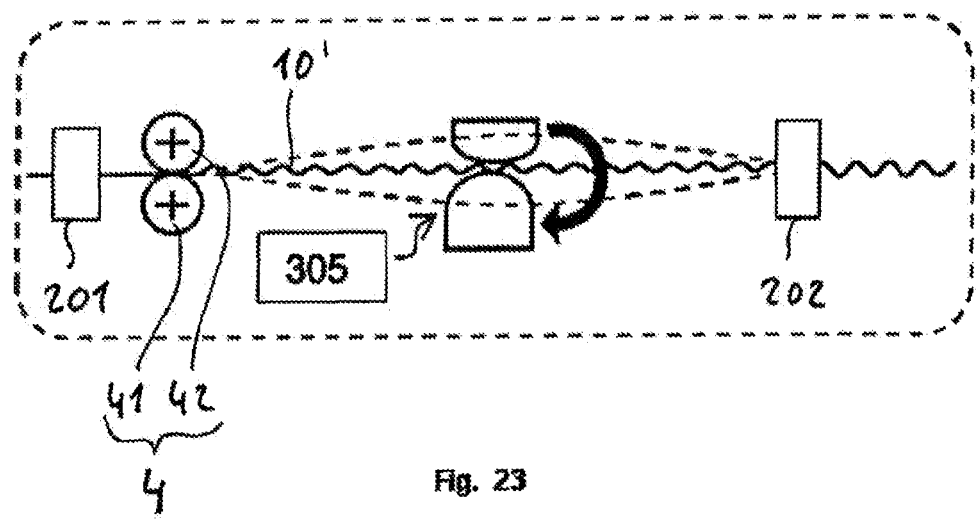
Fig. 23

SAWING WIRE, METHOD AND EQUIPMENT FOR MANUFACTURING SUCH A WIRE, AND USE

BACKGROUND

This invention relates to a serrated sawing wire intended to cut hard materials. It also relates to a method for manufacturing such a wire and equipment for implementing the method of manufacture. Finally, it relates to a method of sawing using such a sawing wire.

In the description hereinbelow, the references between brackets ([ ]) refer to the list of references shown at the end of the text.

The technique of cutting hard materials with a wire is already used for the flow of blocks of monocrystalline or polycrystalline silicon, of semi-conductors, of crystals of magnetic materials, of quartz ceramics or of other brittle materials.

In the case of the production of wafers, i.e. slices of silicon, for the manufacture of photovoltaic solar cells, this technique of sawing by wire is used. The method begins with blocks of monocrystalline or polycrystalline silicon with a square or round section which are cut into thin slices with a thickness between 180 and 280 µm. A simple wire, typically with a diameter of 120 µm and a length from 600 to 900 km, comes from a spool and runs over a bench of four rollers mounted rotatingly around axes parallel to each other and distributed at the tops of a rectangle. The wire surrounds multiple times the rollers and as such forms layers of strands parallel to each other and regularly spaced. Two of the layers are horizontal and receive during the operations of cutting a block of silicon that rests on a layer by its own weight or is pushed by mechanical means. The wire is received at its exit by a receiving spool.

Each strand receives via a nozzle an abrasive paste that it drives to the block. Particles of abrasive 3 are interposed between the wire 1 and the block 2, as shown in FIGS. 12 and 13, which carries out a cutting process via erosion. Grooves 4 with increasing depth parallel to each other are as such carried out through the block 2, until the grooves exit and entirely pass through the block. The abrasive is in general silicon carbide (SiC) with particles 3 with a diameter between 10 and 15 pm. The abrasive paste is formed by a mixture of these particles and an oil or glycol.

This method requires a wire of high quality, with a high tensile strength. A rupture of the wire during the cutting process makes the block unusable.

The sawing wire is in general a single smooth and straight steel filament. It is obtained through wiredrawing on a wet wiredrawing machine and is wound on a spool.

The effectiveness of the sawing operation depends on many parameters such as the features of the material to be cut, the speed of the wire, the nature of the abrasive and of the abrasive paste and the properties of the wire. A determining parameter is the capacity of the wire to drive the abrasive paste and to remove the mixture of abrasive paste and particles drawn from the material, in such a way as to renew the abrasive on the work surface and to prevent blocking of the wire in the groove.

The driving capacities of a smooth wire are limited. It is observed that the particles of abrasive tend to roll between the wire and the surface of the material to be cut, as symbolised by the arrows in FIG. 13. The abrasive therefore damages the wire at the same time as it abrades the material, which results in limiting the length over which it can be used before risking its rupture. The speed of the abrasive is on average half that of the wire.

Another phenomenon is also observed during the beginning of the cut, shown in FIG. 16. When the wire comes into contact with the surface to be sawed, it is simply taut without being guided laterally. The wire rolls on the abrasive and oscillates around its position of equilibrium, in such a way that an initial furrow is dug with a width greater than that of the groove that is then carried out. This results in input fillets 40 of the grooves. This phenomenon results in a substantial increase in the total variation of the thickness for the wafers, which is a substantial loss of quality.

Document WO 90/12670 A1 [1] proposes a monofilament sawing wire comprising a textured outer surface, in such a way that the abrasive is better driven and is detached less easily from the wire. In the forms proposed, the surface of the wire is provided with microcavities or with circumferential grooves. However, the methods of manufacturing such a wire are slow and lack productivity. The cost price for the wire is as such very high. In addition, the wire is weakened by the texture which creates concentrations of stresses and chafing.

Documents EP 1 827 745 A1 [2] and JP 12-89527 [3] show a wire to which crimps have been conferred, i.e. zigzag shaped through a passage between pairs of embossing rollers. Although these solutions have a better driving of the abrasive, the abrupt changes in the curvature of the wire are weak points for the wire which limit the tension that the wire can withstand. In addition, the crimps reduce the longitudinal rigidity of the wire, which can cause blockage of the wire during the sawing process. In order to limit these risks, the speed of the wire is reduced during the sawing, which limits the productivity of the sawing method.

Document JP 2004-276207 A [4] also proposes a wire for sawing. In an embodiment, the wire comprises spiral serrations in order to reserve space between the wire and the groove in order to store and remove the material detached from the part to be cut. However, this wire is excessively flexible longitudinally and has the risk of looping before it enters into the groove.

Moreover, recent developments have resulted in a wire covered with abrasive, in such a way that it is not necessary to use the abrasive paste. The abrasive can be formed from various oxides, carbides, or diamond particles. The particles are maintained on the wire by a binder layer. However, such a wire remains difficult and expensive to produce.

The invention aims to provide a sawing wire that allows for a good driving of the abrasive, a high running speed, that is resistant while still being inexpensive to produce. It also aims to provide a method for manufacturing such a sawing wire and equipment that implements this method.

SUMMARY

With these objectives in view, the invention has for object a monofilament metal sawing wire for a wire saw, said wire saw being constituted of a metal wire with a diameter D and comprising helical serrations of amplitude A and of wavelength B, characterised in that the wavelength B is less than 10,000 times the product A×D of the amplitude and of the diameter and the amplitude A is between 0.010 and 0.400 times the diameter D, with the amplitude being measured by profile projection, with the values expressed in millimeters.

The amplitude of the wire is measured by profile projection, in such a way as to take the measurement without influencing said amplitude. With such features the sawing wire makes it possible to obtain a good driving effect of the abrasive. The sawing effect obtained as such is substantially improved in relation to the smooth and straight wire. In addition, the elongation features are hardly affected by the serrations and the risk of looping during the process of sawing is low. Due to the shape as a propeller, a space is arranged between the wire and the envelope of the wire that is referred to as a driving chamber. The driving chamber extends over a serration pitch and over a height that has for value the amplitude of the serration. The driving chamber is used as a reserve for the abrasive that is as such driven during the sawing operation. It also makes it possible to receive the abraded material and to remove it outside of the sawing zone. It is observed that the abrasive rolls less between the wire and the part and that its speed of displacement is closer to that of the wire, which explains the increase in the effectiveness of the sawing. An increase in the sawing speed of 70% has been observed in relation to sawing with a smooth and straight sawing wire. In addition, as the abrasive moves slower in relation to the wire, the wire does not wear as fast, which allows it to treat a greater length of material to be sawed or authorise several passes. Another advantageous effect of the wire is that it makes it possible to cut parts of a greater width, as the abraded material is removed better and the risk of blockage of the wire by this material in the block to be sawed is reduced. A decrease was also observed in the consumption of abrasive paste, due to the fact that the latter is removed better and remains in contact for a longer period of time with the surfaces to be cut.

As these serrations are uniform, the wire globally retains its straightness, in such a way that the wire remains straight during the sawing process. Better stability of the wire is also observed during contact with the surface to be sawed, as we shall see better in what follows, which reduces the change in thickness of the wafers.

Particularly, the amplitude A is between 0.07 and 0.40 times the diameter D. This factor directly influences the features of wire extension, by maintaining a low propensity for extending. It is however sufficient to allow for driving the particles of abrasive and abraded material. These values can correspond with values of amplitude from 0.01 to 0.15 when the measurements are taken with a micrometer. This type of measurement is carried out for example on diameters greater than or equal to 250 µm. For example, for a wire with a diameter of 0.25 mm, the amplitude of the serrations is preferentially between 4 and 25 µm when it is measured with a micrometer, and between 21 and 100 µm when it is measured with a profile projector.

According to a particular choice, the wavelength B is less than 2,800 times the product A×D of the amplitude and of the diameter, with the values being expressed in millimeters. These values have shown great sawing effectiveness, with the latter increasing with decreasing B beyond this threshold.

According to a preferred feature, the wavelength of the serrations is less than 8 mm. Such a feature has a favorable influence on the risk of looping of the wire during the sawing operation.

By way of example, the diameter D of the wire is between 0.08 mm and 0.50 mm. These values are adapted to many applications, in particular the sawing of silicon wafers. The most frequent values are between 0.12 and 0.30 mm. However, wires of other diameters can have the features of the invention with the same advantages.

According to a complementary feature, the sawing wire comprises a coating of abrasive material. Such a wire does not have any abrasive to drive. However, driving chambers are useful for removing the abraded material. The abrasive material can be a diamond powder.

According to a particular feature of the sawing wire, the section of the wire is not circular. As such, an additional means is available for forming a driving chamber. Indeed, the largest portion of the section determines the position of the wire in the sawing groove, in such a way that the smallest portion is the farthest from the groove and arranges a larger space for the driving chamber.

Particularly, the ratio of a smaller dimension of the section of the wire and of an envelope diameter of the section is between 0.9 and 0.995. Although the difference between the two extreme dimensions of the section is low, an improvement in the effectiveness of the sawing is observed, while still retaining good resistance of the wire, which makes it possible to maintain the conditions for sawing, in particular the tension of the wire.

The invention also has for an object a method for manufacturing a sawing wire such as described hereinabove, characterised in that the wire is scrolled under tension from a first guide to a second guide, vibrations are applied to the portion of the wire between the two guides, with the vibrations being rotating in relation to the section of the wire on the first guide, in such a way that the vibrations induce permanent deformations to the wire in the form of substantial helical serrations.

This method makes it possible to obtain serrations with the desired amplitude and wavelength. In addition, it is observed that the production speed is more interesting than that of the wire serrated by the methods disclosed in documents [2] and [3]. The manufacture can be carried out with specific equipment, by unwinding a spool of smooth and straight wire, or directly by taking the wire at the exit of a wiredrawing die, without imposing a reduction in speed.

According to a first embodiment, vibrations are applied on the wire by blowing a stream of air onto the wire. Such a stream is sufficiently effective to set the wire taught between the guides into vibration. The frequency of the oscillations is close to the resonance frequency determined by the linear density of the wire, its tension and the distance between the guides. The stream of air is preferably continuous, but it can also be modulated. In addition, the vibrations are rotating, i.e. the wire does not oscillate in a particular plane, but describes an elliptical or circular trajectory centred on the axis defined by the guides. The shape of the vibrations and their amplitude can be modulated in particular by the orientation and the position of the air stream in relation to the wire.

According to other embodiments, detailed hereinafter, the wire is driven in rotation on itself by the rotation of the second guide, with the first guide being fixed. As such, even if the vibrations are in a plane, the effect of the deformations is applied in a rotating manner on the wire which then takes helical serrations.

More precisely, according to a second embodiment, vibrations are applied to the wire by an excitation flange comprising at least one bump, with the flange being mounted rotatingly in such a way that the bump interacts with the wire at each rotation of the flange. The vibrations of the wire are created mechanically by the flange which regularly pushes back and releases the wire. In this case also, the frequency of the oscillations is close to the resonance frequency determined by the linear density of the wire, its tension and the distance between the guides. The flange can comprise several bumps, being for example of polygonal shape, such as a triangular, square or hexagonal shape.

According to a third embodiment, the vibrations are applied by the intermediary of a third guide placed between the first and the second guide and mounted oscillating in a plane perpendicular to the wire. The wire is directly driven in its vibrations by the third guide.

According to an option of the third embodiment, the third guide is a wiredrawing die. In this case, the first guide is also a wiredrawing die and the third guide is the last die of the wiredrawing operation. The deformations of the wire are induced both at the exit of the first and of the third guide.

In a complementary manner, the wiredrawing die is rotating around its wiredrawing axis. This movement implies a circular distribution of the serrations of the wire.

According to a fourth embodiment, without rotation of the second guide, the serrations of the wire are generated by a ring placed between the first and the second guide, with the ring comprising a passage for the wire and being driven in rotation around an axis parallel and offset in relation to the passage. As the passage is off-centred in relation to the axis of rotation, rotating oscillations are imposed on the wire, which reverberate to the first guide. It is observed that the deformations imposed as such on the wire provide it with a shape very close to a spiral.

The invention also has for object equipment for manufacturing a wire such as described hereinabove, characterised in that it comprises a first guide and a second guide in order to guide a wire under tension between them, means for driving the wire between the guides and means for exciting in order to vibrate the wire between the two guides.

Particularly, the first guide is a die adjusted to the diameter of the wire. This die can be the last of a piece of wiredrawing equipment. As such, the equipment according to the invention is a simple station in addition to wiredrawing equipment.

According to a constructive arrangement, the means for driving comprise a capstan to draw the wire after its passage in the second guide. The wire is as such drawn through the guides.

The invention also has for an object a method of sawing a material according to which a sawing wire under tension is displaced against the material, characterised in that the sawing wire is a sawing wire such as defined hereinabove.

BRIEF DESCRIPTION OF THE DRAWINGS

The invention shall be better understood and other particularities and advantages shall appear when reading the following description, with the description making reference to the annexed drawings among which:

FIG. 5 is a view similar to FIG. 3 of equipment according to a second embodiment;

FIG. 6 is a detailed view VI of FIG. 5;

FIG. 7 is a view similar to FIG. 3 of equipment according to a third embodiment;

FIG. 8 is a detailed view VIII of FIG. 7;

FIG. 9 is a view similar to FIG. 3 of equipment according to a fourth embodiment;

FIG. 10 is a detailed view X of FIG. 9;

FIG. 11 is a front view of a ring used in the equipment of FIG. 9;

FIG. 16 is a view showing the method of wire sawing according to prior art in a phase of starting the sawing;

FIG. 17 is a view similar to FIG. 16 showing the method of sawing with the sawing wire according to the invention;

FIG. 18 is a diagram showing the test results with sawing wires that have different serration wavelengths;

FIG. 21 is a view of a wire according to an alternative embodiment;

FIG. 22 is a cross-section according to the line XXII-XXII of FIG. 21;

FIG. 23 is a view similar to FIG. 10 of equipment according to a fifth embodiment.

DETAILED DESCRIPTION

Figure 1:
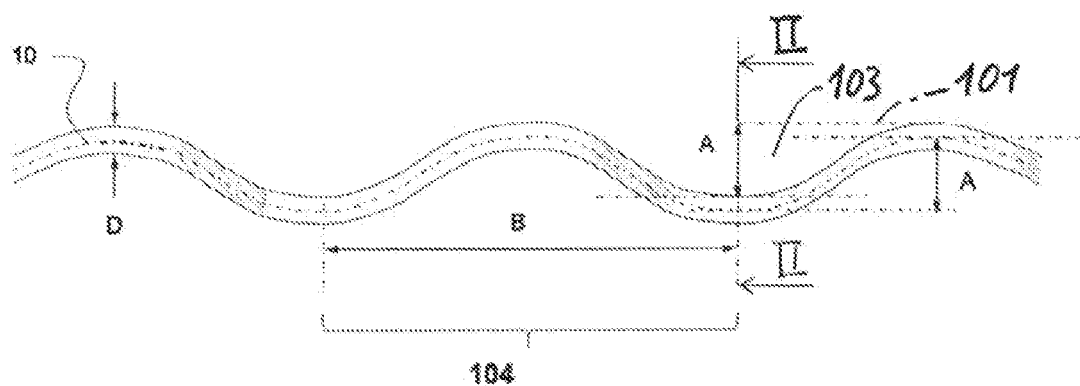
FIG. 1 shows a top view of a sawing wire in accordance with an embodiment of the invention.
Figure 2:
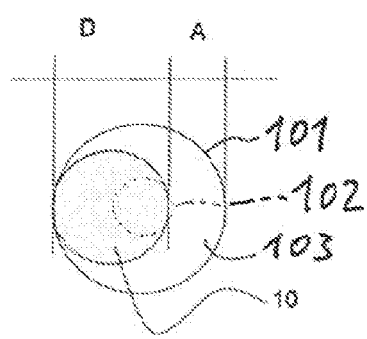
FIG. 2 is a cross-section view according to the line II-II of FIG. 1.

A sawing wire 10 in accordance with an embodiment of the invention is shown in FIGS. 1 and 2. The sawing wire 10 has a constant circular section over its entire length which can extend over several kilometers. The sawing wire 10 comprises helical serrations 104 of low and regular amplitude. In FIG. 1, only a small portion of the sawing wire 10 has been shown, by exaggerating the amplitude of the serrations 104. FIG. 2 shows the sawing wire 10 as a section, wherein the outer circle shows the virtual envelope 101 wherein the wire is inscribed, and the circle in mixed lines 102 shows the location of the centers of the sections of the wire along its length. The sawing wire 10 has a diameter named D. The amplitude of the serrations 104 is noted as A while their wavelength is noted as B. It is observed that the diameter of the envelope is A+D. It is also observed that the amplitude of the serrations 104, corresponding to the diameter of the circle in mixed lines also corresponds to a free space between the envelope 101 wherein the wire is inscribed and the section of the wire. In what follows, this space is referred to as a driving chamber 103.

The sawing wire 10 is preferably made of high-strength steel.

In an embodiment not shown, the wire further comprises a coating including the powder of an abrasive material.

Figure 4:
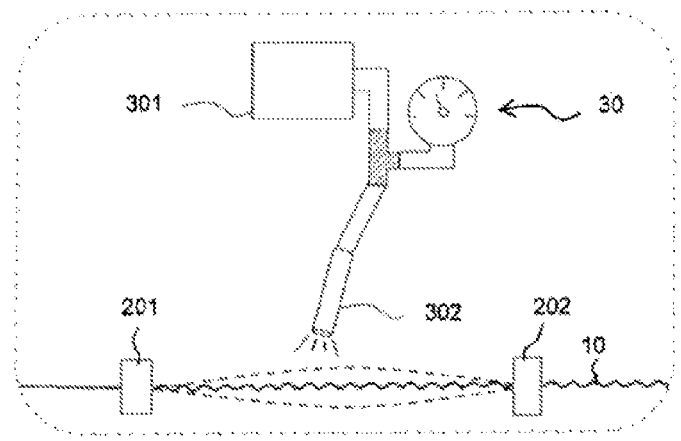
FIG. 4 is a detailed view IV of FIG. 3.
Figure 3:
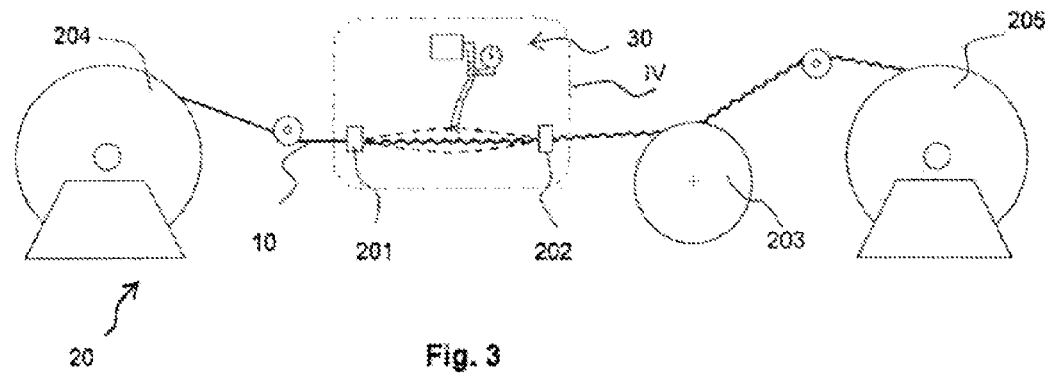
FIG. 3 is a diagrammatical view of equipment for manufacturing the sawing wire in accordance with the invention according to a first embodiment.
Figure 12:
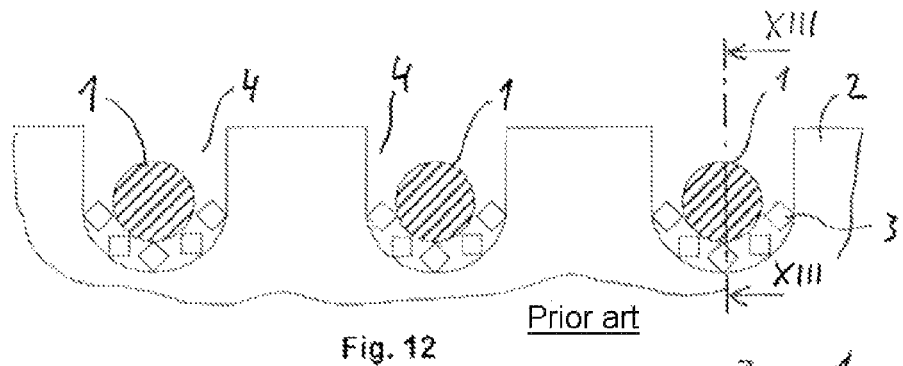
FIG. 12 is a view showing a method of wire sawing according to prior art, with a section perpendicular to the axis of the wires.
Figure 13:
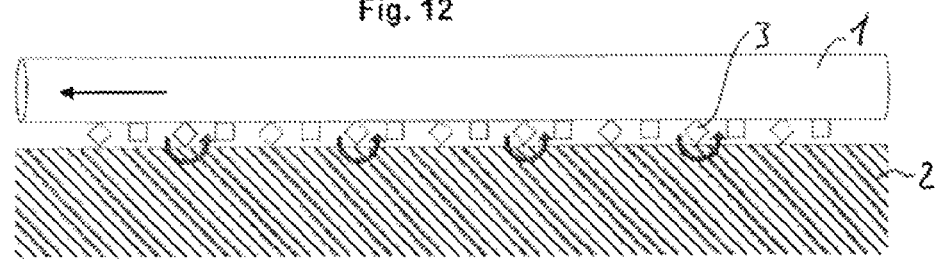
FIG. 13 is a cross-section according to the line XIII-XIII of FIG. 12.

According to a first embodiment of the invention, equipment 20, such as shown in FIGS. 3 and 4 comprises a first guide 201 and a second guide 202 in order to guide a wire under tension between them, means for driving 203 the wire between the guides 201, 202 and means of exciting 30 in order to vibrate the wire between the two guides 201, 202. The first guide 201 is a die adjusted to the diameter of the wire. The means for driving comprise a capstan 203 whereon the wire passes after its passage in the second guide 202. The equipment also comprises a reel 204 which receives a spool of smooth wire and a winder 205 in order to receive the sawing wire 10 and wind it onto a receiving spool.

In the first embodiment, the means of exciting 30 make it possible to generate a stream of air on the wire. For this, a source of air under pressure such as a compressor 301 sends air to a nozzle 302 that is placed on the trajectory of the wire, between the two guides 201, 202.

During the operation of the equipment, a smooth wire is installed on the spool of the reel, it is introduced into the first then the second guide 202, passes over the capstan and finally is wound onto the receiving spool. The wire receives a tension conferred by the capstan and by the first guide 201 which acts as a brake for the wire. The air that is blown by the nozzle 302 onto the wire creates vibrations which are substantially rotating, i.e. that section of the wire seen in a cutting plane at a predetermined distance from the guides 201, 202 travels substantially a circle. The wire is considered as embedded in the first guide 201 and the vibrations of the strand located between the guides 201, 202 locally deform the wire permanently. As the wire advances continuously, the deformation is imposed in directions that change during vibrations of the strand between the guides 201, 202. It is observed that the shape obtained is that described hereinabove, namely helical-shaped serrations 104. The frequency of the oscillations can be regulated by adjusting the tension of the wire and by modifying the distance between the guides 201, 202, in the way of a string of a musical instrument. The wavelength of the serrations 104 on the wire is according to this frequency and to the running speed of the wire.

Equipment 20' according to a second embodiment of the invention is shown in FIGS. 5 and 6. This embodiment differs from the first embodiment in that the means for exciting 30' are different and in that the second guide 202' is driven in rotation around the axis of the wire. The means for exciting 30' comprise a flange 303 mounted rotatingly and comprising a plurality of bumps 3030. Here, the bumps are the tops 3030 of the flange 303 of hexagonal shape.

During operation, when the wire passes between the guides 201, 202', the flange rotates and the tops 3030 of the flange 303 interact with the wire in such a way as to cause it to vibrate. At the same time, the second guide 202' imposes a rotation of the wire on itself. It is observed that the vibrations imposed on the wire as well as the rotation of the wire on itself create the deformations of the wire at the exit of the first guide 201 of the shape such as described hereinabove.

Equipment 20" according to a third embodiment of the invention is shown in FIGS. 7 and 8. This embodiment differs from the first embodiment in that the means for exciting 30" are different and also in that the second guide 202" is driven in rotation around the axis of the wire. The means of exciting 30" comprise a third guide 304 placed between the first and the second guide 201, 202" and mounted oscillating in a plane perpendicular to the wire.

During operation, when the wire passes between the guides 201, 202", the third guide imposes vibrations on the strand between the first and the second guide 202". At the same time, the second guide 202" imposes a rotation of the wire on itself. It is observed that the vibrations imposed on the wire as well as the rotation of the wire on itself create the deformations of the wire at the exit of the first guide 201 of the shape such as described hereinabove.

In an alternative of the third embodiment, not shown, the third guide is the last die of a piece of wiredrawing equipment, with the first guide being the penultimate die. The wiredrawing method is as such optimised by combining both the steps of wiredrawing and that of the serration of the wire. As a complement, the third guide 304 can also be driven in rotation around its drawing axis, in order to provide for the circular distribution of the serrations.

According to a fourth embodiment of equipment according to the invention, shown in FIGS. 9 to 11, the second guide 202 is fixed. The means of exciting 30'" comprise a ring 305 placed between the first and the second guide 201, 202. The ring 305 comprises a passage 3050 in order to pass the wire.

The ring is mounted rotatingly about an axis "y" offset in relation to the passage 3050, as shown in the front view of the ring in FIG. 11. As such, the rotation of the ring 305 imposes circular vibrations on the wire 10, which drive the helical deformations of the wire 10. This embodiment is considered to be the preferred embodiment by the applicant.

Figure 14:
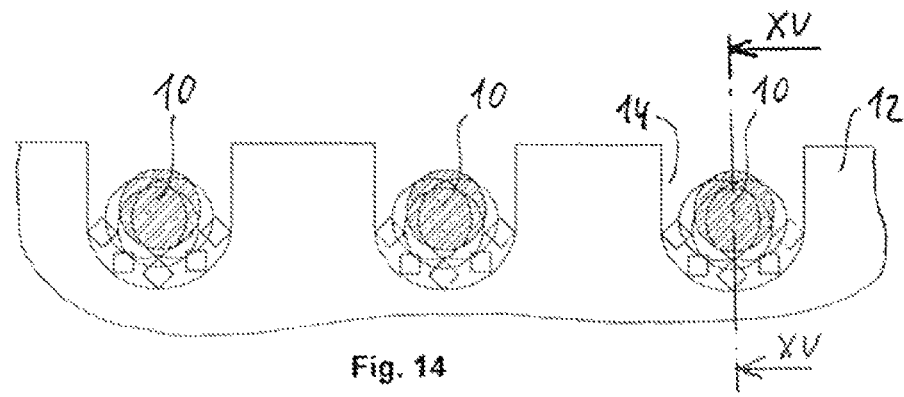
FIG. 14 is a view similar to FIG. 9 showing a method of sawing with a sawing wire according to the invention.
Figure 15:
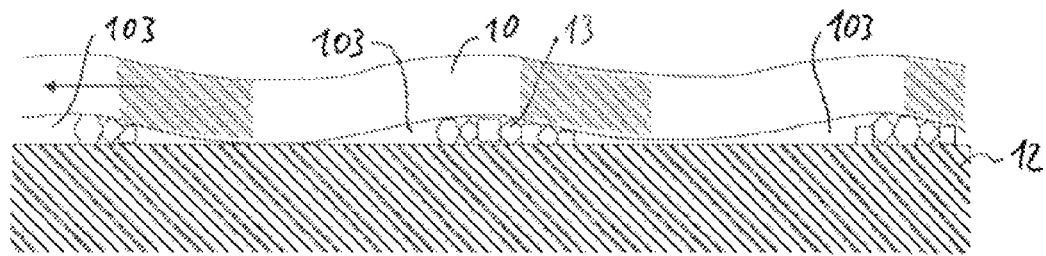
FIG. 15 is a cross-section according to the line XV-XV of FIG. 14.

During the use of a sawing wire 10 according to the invention in an operation of cutting a block 12 of hard material, the sawing wire 10 is run in the same way as according to prior art, with the supply of abrasive paste, as shown in FIG. 14. As shown in FIG. 15, the grains of abrasive 13 tend to be blocked in the driving chamber 103, which substantially drives them at the displacement speed of the sawing wire 10. The effectiveness of the work of erosion, for the same wire speed, is substantially improved.

It is furthermore observed that the contact of the sawing wire 10 with the surface of the block 12 to be cut is more stable and has less oscillations, in such a way that no fillet is created between the grooves 14 and the surface of the block, as shown in FIG. 17. The variation in the thickness of the wafers carried out as such is reduced.

If it is desired to carry out a wire with a coating of abrasive material, the coating is deposited preferably after carrying out the serrations 104.

EXAMPLES

Manufacturing tests have been carried out. A sawing wire has been carried out using a wire with a diameter of 0.120 mm. Serrations have been obtained with an amplitude measured by profile projection varying from 0.006 to 0.125 mm. On the equipment 20 according to the first embodiment, the pitch of the serration was 6 mm. On the equipment 20' according to the second embodiment, the serration pitch B was 10 mm. On the equipment 20" according to the third embodiment, the serration pitch B was 8 mm.

Figure 19:
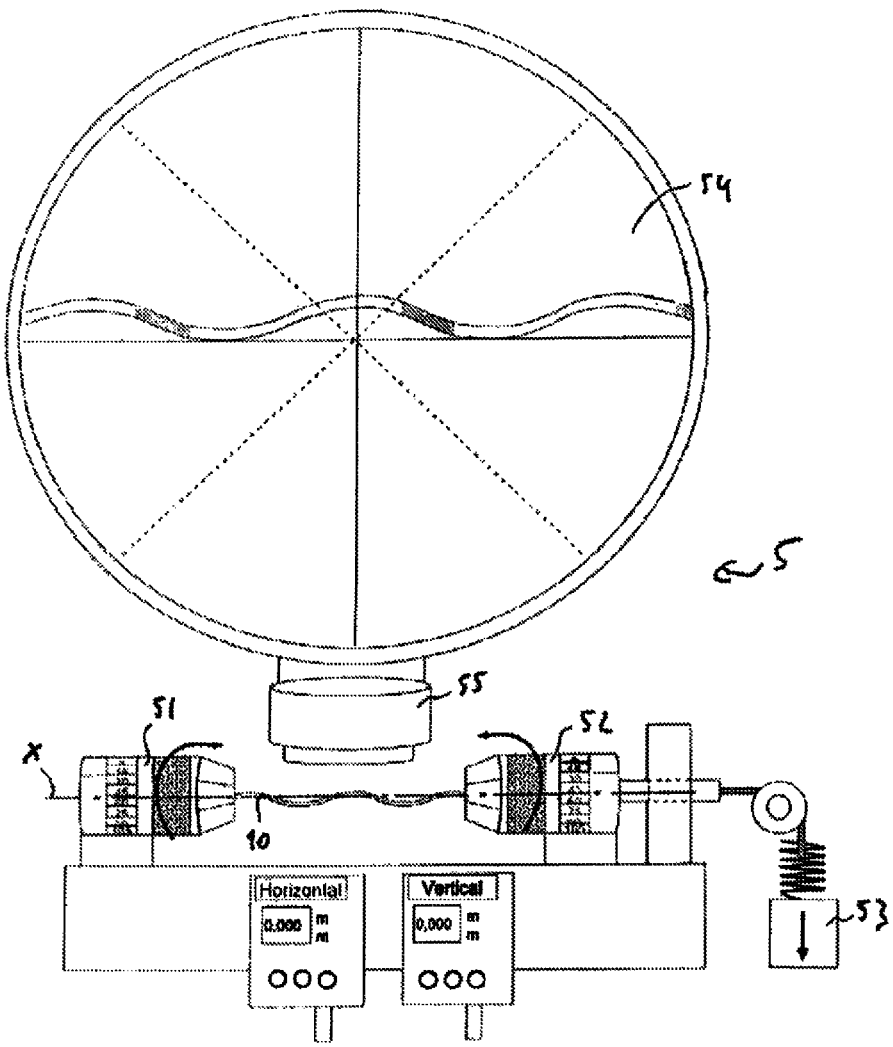
FIG. 19 is a view of a profile projector used to measure the features of a wire in accordance with the invention.
Figure 20:
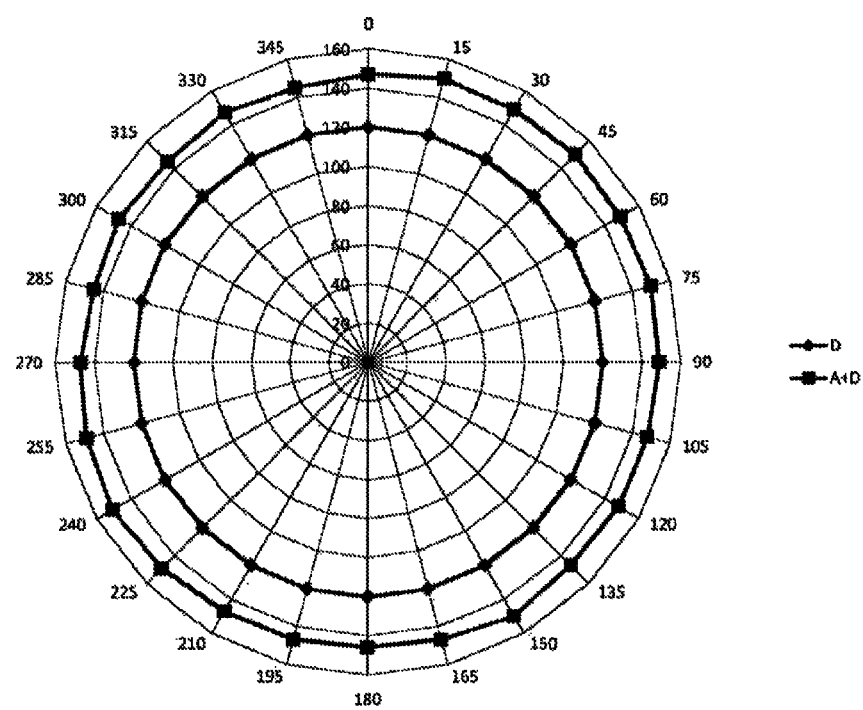
FIG. 20 is a diagram of a series of measurements on a sample that shows the diameter of the wire and the diameter plus the amplitude according to the angular position, in a polar diagram.

In order to take the amplitude measurements, a profile projector 5 was used in the optical field of which the sawing wire 10 was mounted. In order to mount the wire, a mounting was used, as shown in FIG. 19, comprising two mandrels 51, 52 facing each other and between the jaws of which the wire 10 is pinched. One of the mandrels 52 is mounted slidingly and the wire 10 is placed under tension by a counterweight 53 of x g which tends to separate the mandrels 51, 52 from one another. The counterweight makes it possible to maintain the wire 10 globally straight without influencing the amplitude of the serrations. The mandrels 51, 52 are mounted rotatingly in such a way as to regulate the angular position of the wire around its axis X. As such, the amplitude A of a serration can be measured directly in the projection screen 54 of the projector 5 by dividing the measurement by the magnification factor which is for example 100. In addition, this amplitude A can be measured at different angular positions of the wire around its axis. The set of mandrels 51, 52 is also mounted mobile on an X-Y table. FIG. 20 graphically shows a series of measurements on a sample that shows the diameter of the wire and the diameter plus the amplitude (D+A) according to the angular position, in a polar diagram. It is observed that the variation in the amplitude A is low according to the angular position. It is concluded that the shape of the wire is very close to a propeller. With the X-Y table, the wavelength can also be measured, for example by displacing the wire in order to offset the wire of a wave in the field of the lens 55 of the projector.

Other methods of measuring the amplitude were tested. However, the method of projection of the profile is preferred. Indeed, measuring the amplitude using a micrometer (also called palmer) was tried. However, it is observed that the pressure of the keys very substantially modifies the geometry of the wire, which distorts the measurement.

Cutting tests were conducted with wires of different features. The values of these features are provided in table 1.

TABLE 1

| Sample | Diameter D (mm) | Amplitude A (mm) | Wavelength B (mm) | B/(A × D) |
|---|---|---|---|---|
| Smooth wire (reference) | 0.120 | 0 | — | — |
| E 2 | 0.120 | 0.024 | 2 | 694 |
| E 4 | 0.120 | 0.024 | 4 | 1389 |
| E 6 | 0.120 | 0.024 | 6 | 2083 |
| E 8 | 0.120 | 0.024 | 8 | 2778 |
| E 10 | 0.120 | 0.024 | 10 | 3472 |

The tests were conducted for the cutting of a block of polycrystalline silicon with a section of 120×120 mm having a length of 1000 mm. The test results are shown in FIG. 18. The graph shows the surface cut according to a number representing the length of wire that passed in the groove. It is observed that all of the sawing wires according to the invention are more effective than a smooth sawing wire. In addition, the effectiveness increases with the decrease in the wavelength of the serrations. The time required for cutting the block can be reduced by more than 60% in relation to the reference time with a smooth wire.

The speed of the scrolling of the smooth wire was limited to 800 m/min in order to prevent the risk of looping, although the commonly used limit is 600 m/min. With the wire according to the invention, a speed of 1500 m/min was obtained with a stable unwinding.

It is therefore considered that the wavelength of the serrations 104 of the sawing wire 10 must preferably be less than 2,800 times the product A×D, with the values expressed in millimeters. In these examples, the ratio A/D is ⅕. This value is within the range of 0.01 to 0.40, and also within the range of 0.07 to 0.40.

In an alternative embodiment of the sawing wire 10', shown in the FIGS. 21 and 22, the section of the wire 10' is not constant. It has in the example shown two flats 105 parallel and opposite each other. By noting as D the maximum dimension of the section of the wire 10' and d the distance between the flats 105, which also corresponds to the smallest dimension of the section, the dimensions are chosen with a ratio d/D between 0.9 and 0.995.

In order to manufacture such a wire 10', equipment is used according to a fifth embodiment of the invention, shown in FIG. 23, which is an alternative of the equipment according to the fourth embodiment. A rolling mill 4 is installed after the first guide 201. The rolling mill 4 comprises two rollers 41, 42 with parallel axes of rotation and which clamp the wire 10' between them in such a way as to form the two flats 105 by deformation of the wire. The wire 10' undergoes the vibrations at the exit of the rolling mill 4, with the vibrations being imposed by the ring 305.

The invention is not limited to the embodiments that have just been described for the purposes of information only. The equipment can be placed directly at the exit of a piece of wiredrawing equipment, in such a way that the reel is not required and that the means for driving are common to the two pieces of equipment. The first guide can even then in this case be one of the dies of the wiredrawing equipment. The capstan could play the role of the second guide if it is sufficiently close to the means for exciting.

The invention claimed is:

1. A monofilament metal sawing wire for a wire saw, said wire saw comprising: a metal wire with a diameter D and comprising helical serrations with an amplitude A and a wavelength B, wherein the wavelength B is less than 10,000 times the product A×D of the amplitude and of the diameter and the amplitude A is between 0.010 and 0.400 times the diameter D, with the amplitude being measured by profile projection, with the values expressed in millimeters.

2. The sawing wire according to claim 1, wherein the amplitude A is between 0.070 and 0.400 times the diameter D.

3. The sawing wire according to claim 1, wherein the amplitude A is between 0.010 and 0.150 times the diameter D.

4. The sawing wire according to claim 1, wherein the wavelength B is less than 2,800 times the product A×D of the amplitude and of the diameter.

5. The sawing wire according to claim 1, wherein the diameter D is between 0.08 mm and 0.50 mm.

6. The sawing wire according to claim 1, said wire comprises a coating of abrasive material.

7. The sawing wire according to claim 1, wherein the section of the wire is not circular.

8. The sawing wire according to claim 7, wherein the ratio of a smaller dimension of the section of the wire and an envelope diameter of the section is between 0.9 and 0.995.

9. A method for manufacturing a sawing wire according to claim 1, wherein the wire is made to run under tension from a first guide to a second guide, vibrations are applied to the portion of the wire between the two guides, with the vibrations being rotating in relation to the section of the wire on the first guide, in such a way that the vibrations induce permanent deformations to the wire in the form of substantially helical serrations.

10. The method according to claim 9, wherein the vibrations are applied to the wire by blowing a stream of air onto the wire.

11. The method according to claim 9, wherein the wire is driven in rotation on itself by the rotation of the second guide, with the first guide being fixed.

12. The method according to claim 11, wherein vibrations are applied to the wire by an excitation flange comprising at least one bump, with the flange being mounted rotatingly in such a way that the bump interacts with the wire at each rotation of the flange.

13. The method according to claim 11, wherein the vibrations are applied by the intermediary of a third guide placed between the first and the second guide and mounted oscillating in a plane perpendicular to the wire.

14. The method according to claim 13, wherein the third guide is a wiredrawing die.

15. The method according to claim 14, wherein the wiredrawing die is rotating around the wiredrawing die drawing axis.

16. The method according to claim 9, wherein the vibrations of the wire are generated by a ring placed between the first and the second guide, with the ring comprising a passage for the wire and being driven in rotation around a parallel axis (y) and offset in relation to the passage.

17. The equipment for manufacturing a wire according to claim 1, comprising: a first guide and a second guide configured to guide a wire under tension between the first and second guide, means for driving the wire between the guides and means for exciting configured to cause the wire to vibrate between the two guides.

18. The equipment for manufacturing a wire according to claim 17, wherein the first guide is a die adjusted to the diameter of the wire.

19. The equipment for manufacturing a wire according to claim 17, wherein the means for driving comprise a capstan in order to draw the wire after its passage in the second guide.

20. A method for sawing a material wherein a sawing wire under tension is displaced against the material, wherein the sawing wire is a sawing wire according to claim 1.

* * * * *